United States Patent [19]
Iverson

[11] 4,193,606
[45] Mar. 18, 1980

[54] MACHINERY SEAL

[76] Inventor: Dennis H. Iverson, 3557 Suniland Dr., Salt Lake City, Utah 84109

[21] Appl. No.: 915,803

[22] Filed: Jun. 15, 1978

Related U.S. Application Data

[63] Continuation of Ser. No. 682,121, Apr. 30, 1976, abandoned.

[51] Int. Cl.² .............................................. F16J 15/32
[52] U.S. Cl. ..................................... 277/205; 277/165
[58] Field of Search ........................... 277/165, 87, 205

[56] References Cited

U.S. PATENT DOCUMENTS

| | | | |
|---|---|---|---|
| 2,419,588 | 4/1947 | Pasco | 277/87 |
| 3,851,888 | 12/1974 | Limpson et al. | 277/165 |

*Primary Examiner*—Robert I. Smith
*Attorney, Agent, or Firm*—Criddle & Western

[57] ABSTRACT

There is disclosed a U-cup type machinery seal for circumferential placement about a rotating and/or reciprocating member. The seal comprises a boot having a generally V-shaped groove therein and an expander of generally triangular cross-section in the groove for biasing radially positioned lips into sealing engagement with the machinery to be sealed.

5 Claims, 5 Drawing Figures

MACHINERY SEAL

This is a continuation of application Ser. No. 682,121, filed Apr. 30, 1976, and now abandoned.

This invention relates to composite machinery seals, and particularly to an improved U-cup type seal.

It is known in the prior art to provide a composite generally annular seal having an annular groove therein for receiving a resilient ring to expand sealing edges of the seal into engagement with stationary and moving machinery parts. Prior art composite seals of this type may use an O-ring expander, as shown in U.S. Pat. Nos. 3,169,776 and 3,342,500, or may use a tetralobal expander, such as illustrated in U.S. Pat. No. 3,851,888.

Although the composite U-cup type machinery seals of the prior art operate satisfactory, there is room for improvement. Specifically, round and tetralobal shapes are not the most efficient means of expanding a surrounding boot in order to place lips thereof in sealing engagement with machinery. In addition, improvements can be made in seal stability, particularly in retaining the expander in position in the groove. For example, a high pressure pulse may tend to spread the legs of the bifurcated boot thereby allowing the prior art expanders to pop out of its associated groove. As will become more fully apparent hereinafter, the device of this invention provides an efficient means for forcing the sealing lips radially inwardly and outwardly and, by the quantity and annular disposition of the material retaining the expander in its associated groove, more efficient means are provided for retaining the expander in position.

It is an object of this invention to provide a composite seal which exhibits improved stability.

Another object of this invention is to provide a composite seal having more efficient means for spreading the sealing lips thereof.

In summary, the composite seal assembly of this invention comprises an annular elastomeric boot having a base portion and a bifurcated portion providing radially inner and outer annular sealing lips, an annular generally V-shaped groove having the wide section thereof annularly opening through the boot opposite from the base portion and having the apex thereof pointed toward the base portion, and a pair of annular ribs overlying the V-shaped groove and restricting the opening thereof through the boot. The composite seal assembly of this invention further comprises an annular elastomeric expander, in the V-shaped groove having a generally wedge shaped section received in the V-shaped groove for biasing the sealing lips apart and having one side thereof abutting the annular ribs and constrained thereby against axial movement out of the V-shaped groove. The complimentary V-shaped groove and generally wedge shaped expander provides a more efficient means of biasing the sealing lips against machinery parts to be sealed.

IN THE DRAWING

Figure 1:
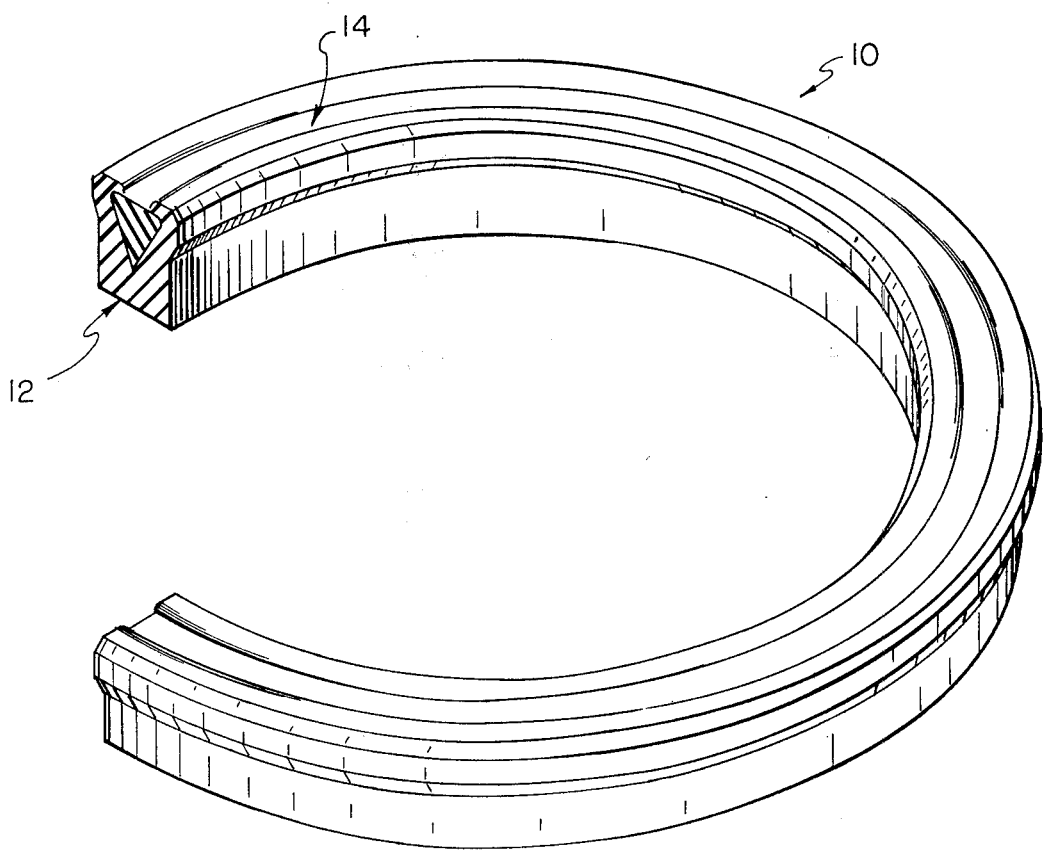
FIG. 1 is a broken isometric of a composite seal made in accordance with the principles of this invention.
Figure 2:
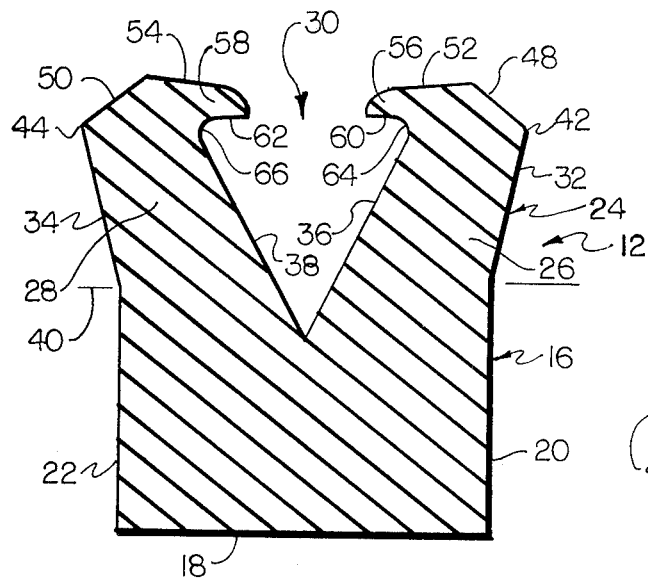
FIG. 2 is an enlarged cross-sectional view of the boot of this invention.
Figure 3:
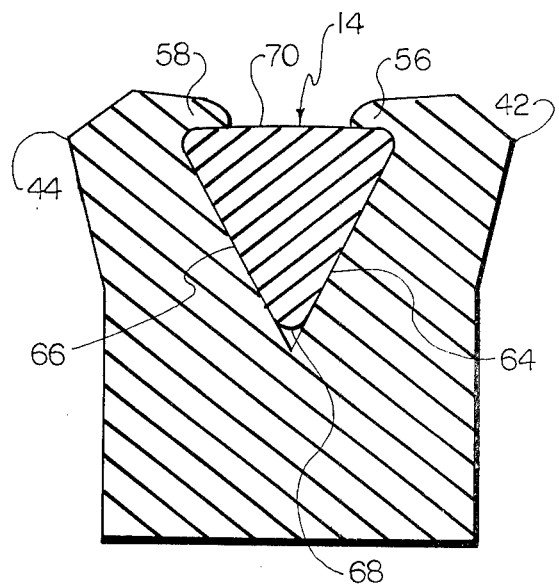
FIG. 3 is an enlarged view of the broken portion of FIG. 1 and comprises a cross-sectional view of the assembled boot and expander of this invention prior to assembly.

Referring to FIGS. 1–3, the composite seal 10 of this invention comprises as major components an annular boot 12 of generally U-cup configuration and an elastomeric resilient ring spring or expander 14. As used herein, the high pressure side of the seal 10 is referred to as the back while the low pressure side is referred to as the front.

The boot 12 is of generally annular shape providing a base portion 16 defined by a generally planar front surface 18, a radially inner annular side surface 20 and a radially outer annular side surface 22 generally parallel to the inner side surface 20. Extending from the base portion 16 is a bifurcated portion 24 comprising a pair of legs 26, 28 bounded by an annular generally V-shaped groove 30, an inclined radially inner side surface 32 and an inclined radially outer side surface 34. As will be apparent from FIG. 2, the side surfaces 32, 34 diverge away from the base portion 16.

The V-shaped annular groove 30 provides an inclined radially inner side surface 36 and an inclined radially outer side surface 38 which converge at a location within the base portion 16. It will accordingly be seen that the groove 30 terminates forwardly of a plane 40 defined by the juncture of the diverging side surfaces 32, 34 with the parallel side surfaces 20, 22. It will also be seen that the legs 26, 28 taper in width and become progressively narrower toward the back of the boot 12. The minimum radial dimension of each of the legs 26, 28 accordingly occurs in a plane intersecting the radially inner and outer sealing lips 42, 44 while the minimum thickness of each of the legs 26, 28 is indicated by a dimension E in FIG. 5. One effect of this configuration is that the legs 26, 28 are most flexible adjacent the sealing lips 42, 44.

Figure 5:
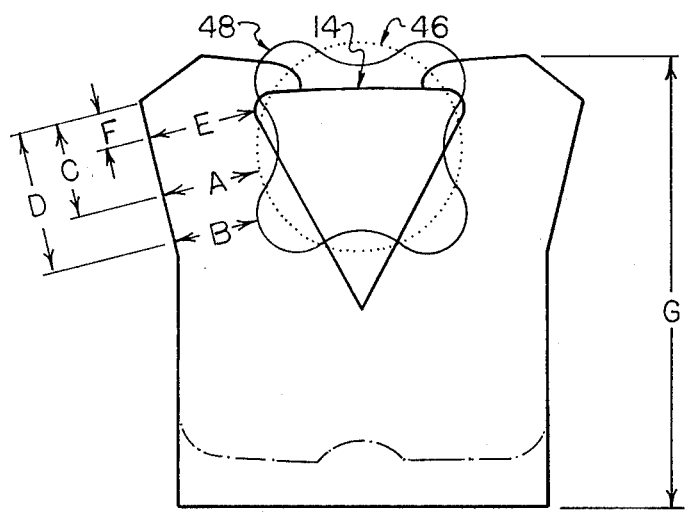
FIG. 5 is a view superposing machinery seals having prior art expanders of circular and tetralobal cross-section on a machinery seal of this invention.

Referring to FIG. 5, it has been stated in the literature that the rod seal in a cylinder is subject to its highest stresses when the cylinder is retracting. At this time the rod seal is containing maximum pressure, and the retraction of the rod is, through friction, attempting to tear the seal apart. Whether the seal survives or is damaged is said to be a function of the thickness of the material in the bifurcated leg and the distance from the area of minimum thickness to the lip seal. In the prior art device incorporating an O-ring expander 46, the minimum thickness is dimension A located a distance C from the lip. In the prior art device incorporating a tetralobal expander 48, the minimum thickness is dimension B located a distance D from the lip seal. It has been stated that the machinery seal incorporating the tetralobal expander 48 is more susceptible to lip tear than is the machinery seal incorporating the O-ring expander 46. The reasons given are that the dimension B is less than the dimension A and that the force attempting to tear off the lip due to friction is substantially greater due to the greater area represented by the dimension D compared to the area represented by the dimension C.

If this analysis is correct, it should be apparent that the seal 10 of this invention is least susceptable to lip tear since the dimension E is greater than either of the dimensions A, B and since the distance F is less than either of the distances C, D.

Referring back to FIG. 2, the bifurcated portion 24 of the boot 12 includes a pair of reverse bevel surfaces 48, 50 commencing with the sealing lips 42, 44 and terminating respectively in a radially inner and a radially outer back surface 52, 54. The boot 12 further comprises a radially inner and a radially outer rib 56, 58 overlying the V-shaped groove 30 and restricting the opening thereinto. The ribs 56, 58 comprise radially inner and outer annular co-planar surfaces 60, 62 which respectively merge into the surfaces 36, 38 through a circular arc 64, 66. It will be evident that the surfaces 60, 62 are perpendicular to a central axis of the seal 10 and boot 12. As will be pointed out more fully hereinafter, the surfaces 60, 62 overlie and captivate the expander 14 in the groove 30.

Referring to FIG. 3, the expander 14 comprises an annular elastomeric member having radially inner and outer sides 64, 66 converging and merging into a smooth apex 68. The expander 14 is illustrated as comprising a radially positioned generally planar back surface 70 smoothly merging with the surfaces 64, 66, although the surface 70, centrally of the lips 56, 58, may be rearwardly concave or convex. It will accordingly be apparent that the expander 14 is of generally triangular cross-section in which the surfaces 64, 66 comprise a wedge. Since the expander 14 is somewhat larger in cross-sectional area than the groove 30 provided by an unstressed boot 12, as in FIG. 2, placement of the expander 14 in the groove 30 causes radially inner and radially outward movement of the sealing lips 42, 44 respectively. Insofar as its biasing function is concerned, it will be apparent that the wedge shaped expander 14 is quite efficient. It will also be apparent that the ribs 56, 58 constitute an efficient means of captivating the expander 14 since the surfaces 60, 62 are substantially perpendicular to an axial path of movement of the expander 14 out of the groove 30. For purposes more fully pointed out hereinafter, it will be seen that the maximum radial dimension of the expander 14 lies in a plane intersecting the sealing lips 42, 44.

Figure 4:
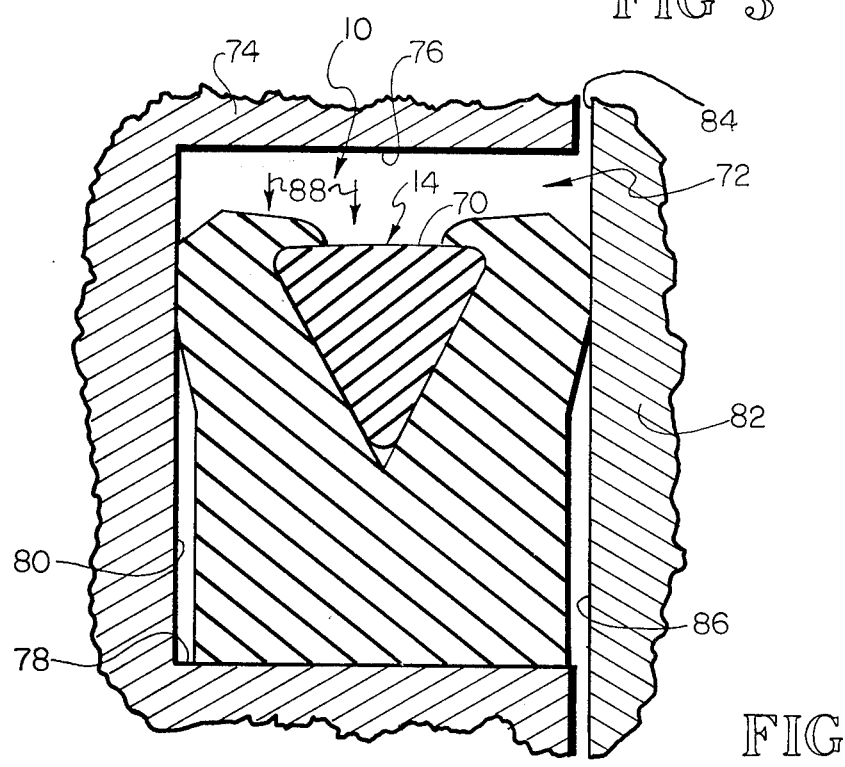
FIG. 4 is a view similar to FIG. 3 illustrating the improved composite seal of this invention in operative position.

Referring to FIG. 4, the seal 10 is illustrated as positioned in an annular groove 72 provided in a machinery part 74 and comprised of a pair of annular surfaces 76, 78 and a sealing surface 80. The seal 10 engages another machinery part 82 to provide a pressure seal between the relatively rotating and/or reciprocating parts 74, 82. The back of the seal 10 is exposed to relatively high pressure through a clearance gap 84 while the front of the seal 10 is exposed to relatively low pressure through a machinery gap 86. The seal 10 is sized such that the expander 14 biases the sealing lips thereof into sealing engagement between the surface 80 and the machinery part 82. In addition, high pressure fluid, usually liquid, admitted through the clearance gap 84 acts in the direction indicated by the arrows 88 to further force the expander 14 into the groove 30 thereby further radially forcing the sealing lips into engagement with the machinery parts 74, 82. Since the maximum radial dimension of the expander 14 lies in a plane intersecting the sealing lips, the effect of both mechanical and pressure biasing of the sealing lips is enhanced.

A comparison of FIGS. 4 and 5 will reveal another advantage of the seal 10 of this invention. In the operative stressed position of FIG. 4, the back surface 70 of the expander 10 is in front of the plane of the back surfaces 52, 54. This is in contrast to the prior art devices incorporating the O-ring expander 46 or the tetralobal expander 48. In the stressed operative position of the prior art seals, the O-ring expander 46 and the tetralobal expander 48 extend backwardly of the back surface of the corresponding boot more than is illustrated in FIG. 5 which is, of course, an illustration of the nominal configuration. Thus, the depth of the prior art seals in the stressed operative position is the sum of the depth of the boot and the depth of the expander rearwardly of the back boot surface. Since the seal 10 of this invention is designed to fit the same glands as the prior art seals, the depth of the boot 12, which is suggested by the dimension G, is greater than the depth of the prior art boots. This is of advantage since the rectangular configuration of the seal 10 of this invention makes it less susceptable to rotating in the groove 72 as compared to the essentially square cross-section of many of the prior art seals.

As is known in the art, the seal 10 may preferably be made of a deformable but substantially non-compressible material, which may for instance comprise rubber, neoprene, urethane, or any other suitable elastomeric or plastic material.

Although the invention has been shown and described with respect to a preferred embodiment, it should be understood that those skilled in the art that various changes and omissions in the form and detail thereof may be made without departing from the spirit and scope of the invention.

I claim:
1. A composite seal assembly comprising:
an annular elastomeric boot having a central axis and having:
A base portion having a flat front and parallel radially backwardly extending inner and outer side walls,
a bifurcated portion contiguous with and inclined backwardly radially away from the parallel inner and outer base side walls a given distance and then reversibly beveled backwardly radially toward the parallel inner and outer base side walls to form radially inner and outer annular pointed sealing lips which intersect in a plane perpendicular to the central axis,
an annular generally V-shaped groove having the wide section thereof annularly opening through the rear of the boot in the bifurcated portion opposite the flat front of the base portion such that said wide section of the groove and said inner and outer annular pointed sealing lips are in substantially the same plane,
a pair of annular ribs contiguous with the reversely beveled portion of the sealing lips forming the rearmost portion of the boot and having flat undersides overlying the V-shaped groove restricting the annular opening thereof, and
a wedge shaped annular elastomeric expander having flat sides and dimensions slightly larger than the space defined by the V-shaped groove and overlying annular ribs and having the widest portion adapted to fit into the widest portion of the V-shaped groove said wedge shaped expander being deformed into the V-shaped groove such that the greatest mass of the expander is just forward of the annular ribs and in a plane substantially even with the sealing lips causing the sealing lips to be biased apart and having the flat underside of each overlying annular rib firmly engaged with a corresponding flat surface of the wedge shaped expander thereby constraining the expander from backward axial movement out of the V-shaped groove, said expander being positioned in said groove such that the back surface of said expander is forward of the back surface of the overlying ribs.

2. The seal assembly of claim 1 wherein the boot bifurcated portion provides generally mirror image radially inner and outer sides diverging away from the boot base portion, the apex of the V-shaped groove extending through the bifurcated portion into the base portion, and the expander extending into the terminus of the V-shaped groove in the base portion.

3. The seal assembly of claim 2 wherein the expander is of generally triangular cross section.

4. The seal assembly of claim 3 wherein the annular ribs each provide an annular surface facing into the groove and disposed in a plane wherein the flat undersides of the annular ribs are generally perpendicular to the central axis of the boot.

5. The seal assembly of claim 4 wherein the juncture of the ribs and the rear surface of the expander defines a plane.

* * * * *